Feb. 14, 1961          M. F. BAUER          2,971,780
PORTHOLE TUBE FITTING HAVING SELF-ALIGNED COINED FLUID SEAT
Filed April 23, 1959
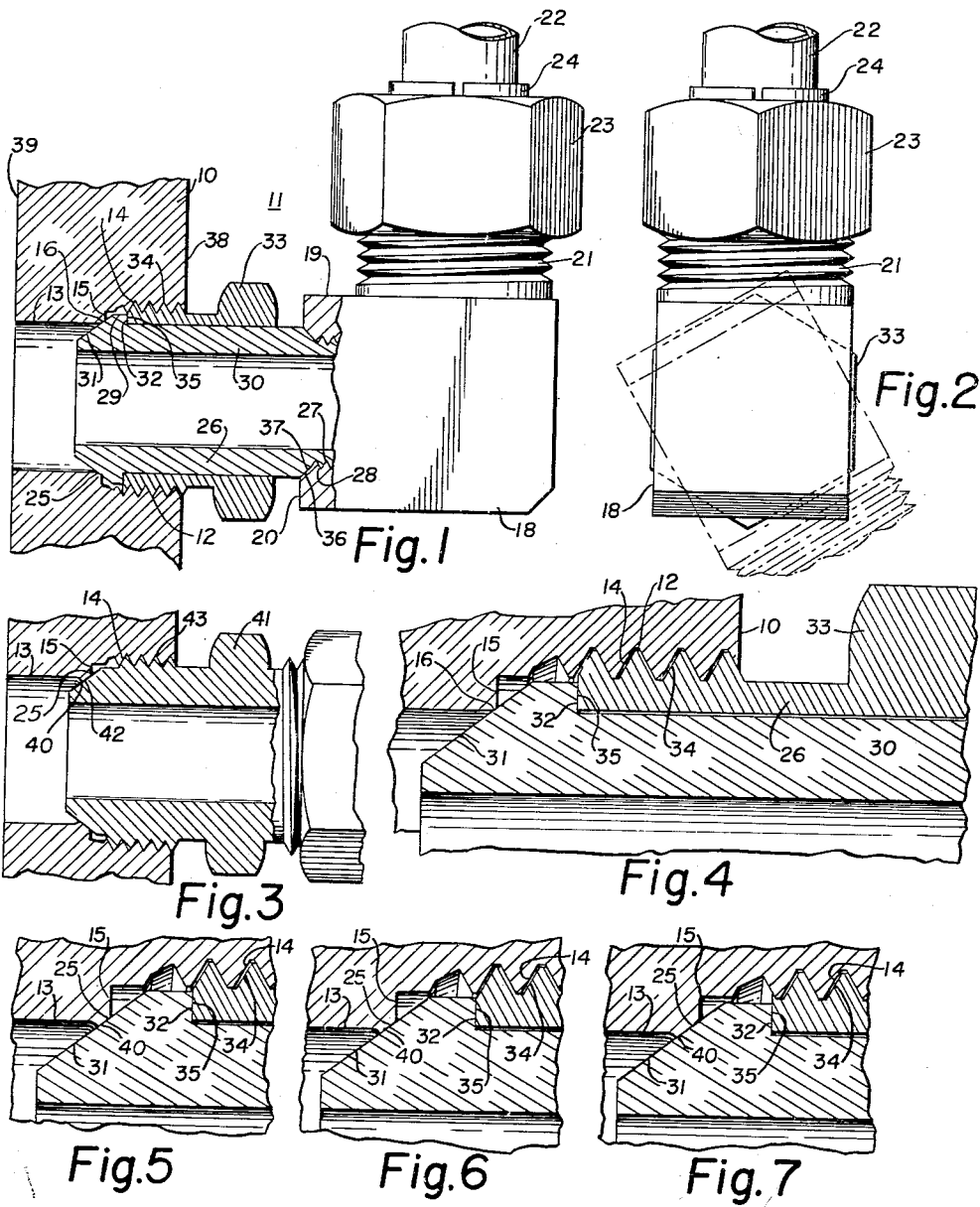
INVENTOR.
MATTHEW F. BAUER
BY
Straddling and Krost.
ATTORNEYS United States Patent Office 2,971,780
Patented Feb. 14, 1961

2,971,780

PORTHOLE TUBE FITTING HAVING SELF-ALIGNED COINED FLUID SEAT

Matthew F. Bauer, 16129 Northvale Blvd., Cleveland 12, Ohio

Filed Apr. 23, 1959, Ser. No. 808,434

4 Claims. (Cl. 285—215)

The invention relates in general to a fluid connection and more particularly to a fluid connection between a connection body and a fitting device.

This application is a continuation-in-part of my pending application Serial No. 611,633 and now abandoned.

When a fitting device is screwed into a connection body such, for example, as a valve, cylinder or pump body, a great deal of difficulty has been experienced when using pipe threads. Separate from the fault of leakage, the major problem resides in the fact that the fitting device swells the threaded porthole and distorts the connection body. This swelling of the porthole and the distortion of the body is particularly objectionable in valve bodies where close clearances must be maintained between the valve and the valve body. Faulty valve operation is the result. In the past, attempts have been made to eliminate the swelling of the porthole when the fitting is turned thereinto by the use of O-rings or other sealing gaskets such as shown in Patent No. 2,342,425, issued February 22, 1944. These types of fittings in the trade are generally referred to as straight thread O-ring bosses, or simple, O-ring boss mountings. As is well known in the trade, these O-ring boss mountings are not completely satisfactory because they readily become damaged in high pressure operation, resulting in leakage.

An object of the present invention is to make a fluid connection between a connection body and a fitting device with a metal-to-metal seal and at the same time prevent swelling of the porthole when the fitting is turned thereinto.

Another object of the invention is the provision of a fluid connection having a metal-to-metal seal which is self-aligning regardless of any misalignment between the fitting device and the connection body.

Another object of the invention is the provision of a fluid seal connection which makes its own seat as the fitting device is turned into the porthole of the connection body.

Another object of the invention is the provision of coining a fluid seat in a substantially sharp corner around a circular opening by pressing a substantially conical body thereagainst with the force applied to the conical body at a place which is substantially in longitudinal alignment with said fluid seat being coined.

Another object of the invention is the provision of coining a fluid seat in a substantially sharp corner around a circular opening by pressing a substantially conical body thereagainst with a sleeve nut surrounding a shank attached to the conical body, whereby the sleeve nut engages a shoulder on the back side of the conical body at a place which is substantially in longitudinal alignment with said fluid seat being coined.

Another object of the invention is a safety design provision which prevents overtightening or overswedging of the metal-to-metal sealing surface, thereby affording a positive control against the swelling of the porthole.

Another object of the invention is the provision of a shallow porthole which has a depth less than the diameter thereof.

Another object is the provision of supporting the minimum dimension portion of the conical seating surface by an inwardly extending annular ledge which is responsive to fluid pressures to give a fluid pressure seal.

Other objects and a fuller understanding of the invention may be had by referring to the following description and claims taken in conjunction with the accompanying drawing, in which:

Figure 1 is an enlarged and side elevational view of a fluid seal connection embodying the features of the invention with certain portions shown in cross-section to better illustrate the invention;

Figure 2 is an end view of the fitting device shown in Figure 1 looking from right to left, with the dash-dot lines in Figure 2 showing the manner in which the elbow fitting device may be swiveled to any particular direction to accommodate the tubing which is to be anchored thereto;

Figure 3 is a side view of a straight fitting device having portions broken away to illustrate the cross-section of the outline of the fitting device;

Figure 4 is an enlarged fragmentary view of Figure 1 showing the fitting device turned in the porthole finger tight;

Figure 5 is a fragmentary view similar to Figure 4 showing the fitting device turned into the porthole with a minimum torque value;

Figure 6 is a fragmentary view similar to Figure 4 showing the fitting device turned into the porthole with an intermediate torque value;

Figure 7 is a fragmentary view similar to Figure 4 showing the fitting device turned into the porthole with a maximum safe torque value; and Figure 8 shows the self-aligned conical sealing surface when there is misalignment between the fitting device and the connection body as is often the case through imperfect machining operations.

The reference character 10 represents a connection body which may be a portion of a valve, a pump or a cylinder into which a fitting device 11 is threadably and sealingly connected. The connection body has an outside surface 38 and an inside surface 39 and has a first inner cylindrical wall 12 having female threads 14 therein and constituting a porthole to receive the fitting device 11. Disposed axially inwardly of the first inner cylindrical wall is a second inner cylindrical wall 13 constituting a fluid passageway in the connection body. The first and second cylindrical walls 12 and 13 have axes substantially in alignment with each other, although due to machining the axes may not be perfectly in alignment with each other. The first cylindrical wall 12 has a larger diameter than the second cylindrical wall 13 and terminates in a transversely extending abutment wall 15 which is preferably disposed substantially perpendicularly to the axes of the cylindrical walls. The abutment wall 15 and the second cylindrical wall 13 meet with each other to define a substantially right-angle sharp annular corner 16. In actual practice, elaborate machining operations have been set up for making O-ring porthole bosses. With this invention, there is no need for elaborate machining operations to insure perfect sealing. In fact, with the present invention, a perfect seal is assured even though the axes of the first cylindrical wall and the second cylindrical wall may be misaligned or eccentric with respect to each other. Furthermore, a perfect seal may be effected with this invention even though the abutment end wall 15 may have a chattered surface due to machining, or where there are slight tolerances in the depth of the abutment end wall 15 from the outside surface 38 of the connection body. The entire machining operation for the present invention may be performed without special tools and with a minimum of attention.

The fitting device 11 which is illustrated, is of the T or elbow type and comprises a hollow body 18 having an upper side 19 and a left-hand side 20. Extending from the upper side 19 is a hollow arm 21 to which a tube 22 may be connected by means of a sleeve 24 and a nut 23. The construction of the tube, and the sleeve and nut may be of any well known type and may be either of the flare type of construction, the no-flare type of construction or the self-flare type of construction which is now available on the market. Extending from the left-hand side 20 of the hollow body 18 is a hollow arm 26 which is adapted to be connected to the construction body 10. As illustrated, the hollow arm 26 comprises an intermediate shank portion 30 having on the right-hand end thereof male threads 27 and having on the left-hand end thereof a sealing head or sealing end portion 29. The male threads 27 are adapted to threadably engage female threads 28 provided in the hollow body 18. In order to make a good fluid seal the right-hand end of the shank portion 30 is provided with a conical or inclined abutting surface 37 which presses against an inclined shoulder 36 on the hollow body 18.

The sealing head or end portion 29 is provided with an external conical sealing surface 31, flaring from a minimum diameter to a maximum diameter in a direction toward the outside surface 38 at an angle preferably between fifteen and seventy-five degrees with respect to the axes of the fitting or cylindrical walls. Specifically, the angle of the flare is preferably forty-five degrees or thirty-seven and one-half degrees depending upon the material and fluid pressures. The conical sealing surface 31 and said transversely extending abutment 15 preferably have an angle therebetween which lies in a range between fifteen degrees and one-hundred and twenty degrees. The transversely extending abutment wall 15, instead of being substantially perpendicular to the axes of the fitting as shown in the drawings, may comprise an inverted cone, in which case the angle between the conical sealing surface 31 and the transversely extending abutment may be at least one-hundred and twenty degrees.

The conical sealing surface 31 at its minimum diameter has a dimension less than the diameter of the second cylindrical wall 13 and extends axially thereinto. The conical sealing surface 31 at its maximum diameter has a dimension greater than the diameter of the second cylindrical wall 13 and is spaced in an axial direction from and faces the abutment end wall 15.

The approximate width of the abutment end wall 15 is preferably as follows for the respective tube sizes: $\frac{1}{4}''$ tube, .051 inch; $\frac{5}{16}''$ tube, .085 inch; $\frac{3}{8}''$ tube, .085 inch; $\frac{1}{2}''$ tube, .062 inch; $\frac{5}{8}''$ tube, .051 inch; $\frac{3}{4}''$ tube, .086 inch; $\frac{7}{8}''$ tube .094 inch; $1''$ tube, .094 inch; $1\frac{1}{4}''$ tube, .117 inch; and $1\frac{1}{2}''$ tube, .117 inch.

A threaded sleeve nut 33 having male threads 34 thereon surrounds the intermediate shank portion 30. The left-hand end of the threaded sleeve nut 33 is provided with an abuttable nut end 35 which pressed against a shank shoulder 32 on the sealing end portion or head 29, whereby when the threaded sleeve nut 33 is turned into the connection body 10 a tight fluid seal is made between the conical sealing surface 31 and the sharp corner 16 of the connection body 10.

In manufacture, the threaded sleeve nut 33 is inserted over the intermediate shank portion 30 preparatory to threadably turning the male threads 27 into the female threads 28 of the hollow body 18. In order to insure a fluid tight seal between the shank portion 30 and the hollow body 18, the male and female threads 27 and 28 as well as the other mating surfaces are preferably brazed by furnace or other temperature operation. The brazing of the mating surfaces, including the male and female threads 27 and 28 and the inclined shoulder 36 and the inclined abutting surface 37 insures a good fluid tight joint which is not subject to leakage.

The conical sealing surface 31 is harder than the sharp annular corner 16 and may be made harder by the selection of materials, by case hardening or by heat treatment. The conical length of the conical sealing surface 31 is greater than one pitch length of the male and female threads 14 and 34. When pressed against the sharp annular corner 16, the hard conical sealing surface 31 forms thereon a flat conical seating surface or fluid seat 25 which perfectly matches the conical sealing surface 31 regardless of any misalignment between the fitting device 11 and the connection body 10.

The pressing engagement between the abuttable nut end 35 of the sleeve nut 33 and the shank shoulder 32 may be referred to as an annular nut shoulder engagement. The diameter of the inner cylindrical wall 13 and the shank 30 are preferably about the same. These diameters for the respective size of tube fittings, may be approximately as follows: $\frac{1}{4}''$ tube, $\frac{9}{32}$ inch; $\frac{5}{16}''$ tube, $\frac{11}{32}$ inch; $\frac{3}{8}''$ tube, $\frac{13}{32}$ inch; $\frac{1}{2}''$ tube, $\frac{9}{16}$ inch; $\frac{5}{8}''$ tube, $\frac{11}{16}$ inch; $\frac{3}{4}''$ tube, $\frac{13}{16}$ inch; $\frac{7}{8}''$ tube, $\frac{59}{64}$ inch; $1''$ tube, $1\frac{1}{32}$ inch; $1\frac{1}{4}''$ tube; $1\frac{5}{16}$ inch; and $1\frac{1}{2}''$ tube, $1\frac{9}{16}$ inch.

Accordingly, the force for coining the sealing surface or fluid seat 25 by pressing the conical sealing surface 31 against the sharp corner 16 is substantially in longitudinal alignment with the fluid seat 25 being coined. Thus, there are no forces tending to collapse the conical sealing head, because the nut-shoulder engagement is substantially in longitudinal alignment with the fluid seat 25 being coined. That is to say, the maximum diameter of the coined fluid seat 25 is intermediate the radial width of the nut-shoulder engagement. The coining operation compacts the metal at the corner and increases the density of the metal at the fluid seat 25 to make a good sealing connection. The flattened conical seating surface or fluid seat 25 preferably has a maximum width less than one pitch length of the male and female threads 34 and 14. The minimum width preferably is not less than one-fourth of the pitch length of the threads. The male and female threads 34 and 14 are preferably machine threads and not pipe threads.

In practice for a $\frac{1}{4}''$ tube 22 the machine threads are preferably $\frac{7}{16}$—20 (the $\frac{7}{16}$ indicating the outside diameter of the machine threads and the 20 being the number of threads per inch); for a $\frac{5}{16}''$ tube, the machine threads are $\frac{1}{2}$—20; for a $\frac{3}{8}''$ tube, the machine threads are $\frac{9}{16}$—18; for a $\frac{1}{2}''$ tube, the machine threads are $\frac{3}{4}$—16; for a $\frac{5}{8}''$ tube, the machine threads are $\frac{7}{8}$—14; for a $\frac{3}{4}''$ tube, the machine threads are $1\frac{1}{16}$—12; for a $\frac{7}{8}''$ tube, the machine threads are $1\frac{3}{16}$—12; for a $1''$ tube, the machine threads are $1\frac{5}{16}$—12; for a $1\frac{1}{4}''$ tube, the machine threads are $1\frac{5}{8}$—12; for a $1\frac{1}{2}''$ tube, the machine threads are $1\frac{7}{8}$—12.

Accordingly, the lower and upper ranges of the width of the flattened conical seating surface 25 for the respective tube sizes would preferably be as follows: $\frac{1}{4}''$ tube, .0125–.050 inch; $\frac{5}{16}''$ tube, .0125–.050 inch; $\frac{3}{8}''$ tube, .014–.055 inch; $\frac{1}{2}''$ tube, .015–.0625 inch; $\frac{5}{8}''$ tube, .017–.070 inch; $\frac{3}{4}''$ tube, .020–.083 inch; $\frac{7}{8}''$ tube, .020–.083 inch; $1''$ tube, .020–.083 inch; $1\frac{1}{4}''$ tube, .020–.083 inch; and $1\frac{1}{2}''$ tube, .020–.083 inch.

In this invention, the male threads 34 preferably make not more than five full thread engagements with the female threads 14. In the drawing, a four-thread engagement is shown. Thus, if an attempt is made to turn the fitting device brutally tight into the conection body, the threads may tend to strip or give before the conical sealing surface 31 swedges or swells the boss to deform and damage the connection body. The sharp annular corner 16 is disposed inwardly of the connection body 10 from the outside surface 38 for distance less than the outside diameter of the female threads 14. The porthole is thus shallow and does not weaken the connection body.

For most installations, the porthole depth from the sharp corner 16 to the outside surface 38 may not preferably be much more than and possibly less than the following: ¼" tube, 9/32 inch; 5/16" tube, 5/16 inch; ⅜" tube, 11/32 inch; ½" tube, ⅜ inch; ⅝" tube, 13/32 inch; ¾" tube, ½ inch; ⅞" tube, 17/32 inch; 1" tube, 17/32 inch; 1¼" tube, 9/16 inch; and 1½" tube, ¾ inch.

The Figure 4 shows the conical sealing surface 31 just touching the sharp annular corner 16 which is the condition when the machine threads are turned finger tight. Figure 5 shows the machine threads turned with a minimum torque value. Under this situation the sharp annular corner 16 is flattened a minimum amount to make a metal-to-metal seal. In Figure 6, the machine threads are turned to an intermediate torque value in which case the sharp annular corner 16 is flattened an intermediate amount. In Figure 7, the machine threads are turned with a maximum of safe torque and the sharp annular corner 16 is flattened a maximum safe amount. The extent to which the sharp annular corner 16 may be flattened is preferably no greater than one pitch length of the machine threads 14 and 34. In practice, the seal effected by flattening the sharp annular corner 16 as shown in Figures 5, 6 and 7 will make a good fluid seal. In turning the sleeve nut 33 into the connection body, the operator senses a feeling that the conical sealing surface 31 is flattening the sharp annular corner 16 and gives him a cushioning indication that a good seal is being effected. Thus, the operator will stop turning the nut when he feels the cushioning turning becoming tighter. After the machine threads have been turned finger tight, it is only necessary for the operator to turn the sleeve nut 33 less than one full turn because, if an attempt is made to turn the sleeve nut more than one full turn, the operator will instinctively stop turning the nut, being a safety feature. By reducing the number of full thread engagements to five or less, the location of the abutment end wall 15 may be substantially midway between the inside and outside surfaces 38 and 39 of the wall of the connection body 10. The threads 14 and 34 are preferably straight, but may be pipe threads with wide thread tolerance to insure proper coining operation. The sharp annular corner 16 which is to be flattened is located not more than one-half the thickness of the wall of the connection body 10 from the outside surface 38, where maximum resistance to swedging is present. Ordinarily, a clearance of substantially .001 or .004 of an inch clearance is provided between the machine threads 14 and 34. A clearance of substantially .001 to .010 of an inch may be provided between the sleeve nut 34 and the intermediate shank 30. Therefore, a small amount of clearance or leeway is provided for allowing the conical sealing surface 31 to self-align itself with the flattened seating surface 25 to make a perfect metal-to-metal seal. The Figure 8 shows the flattened seating surface 25 as being eccentric as would be the case if the fitting device were not perfectly in alignment with the connection body. Furthermore, the abutment end wall 15 may have a chattered machine finish and yet the metal-to-metal seal effected in the present invention holds high fluid pressure.

Just prior to the time that the threaded sleeve nut 33 is finally turned to its maximum safe torque value, the fitting may be swiveled or turned to any position for connection with the tube 22, see Figure 2 as an illustration as to how a swivel tube fitting may be swiveled to accommodate a connection for a tube.

The Figure 3 shows a straight type fitting 41 which is provided with a conical sealing surface 42. This fitting may be threadably screwed into the machine thread 14 of the connection body and the conical sealing surface 42 will make a metal-to-metal seal as it flattens the sharp annular corner 16 into the conical seating surface 25. The male threads 43 are preferably machine threads and are of the same dimension as the machine threads 34 on the sleeve nut 33. The straight fitting, as shown in Figure 3, does not need a swivel and may be threadably connected directly to the connection body 10. The present invention enables the thread to be machine threads for both the straight fitting as shown in Figure 3 as well as the swivel fitting as shown in Figures 1 and 2 of the elbow and T type.

The coining operation causes the metal of the sharp corner to flow principally in an axial direction in the porthole and forms a radially inwardly extending annular ledge 40 at the minimum dimension of the flattened fluid seat 25 (see Figures 5, 6 and 7). The annular ledge 40 in actual practice may extend inwardly of the cylindrical wall 13 for a distance of approximately .005 to .030 of an inch. Under fluid operation, high fluid pressures tend to press the annular ledge 40 tightly against the conical sealing surface 31 of the head 29 to provide a fluid pressure seal. In other words, the conical seating surface 25 at its minimum dimension is supported by an annular ledge 40 extending inwardly from the cylindrical wall 13 whereby the fluid presses the inwardly extending annular ledge against the conical sealing surface 31 to provide a fluid pressure seal.

The terms substantially "conical sealing surface" and substantially "conical seating surface" may include constructions other than a true cone so long as substantially the same results are obtained. The cone surface may be somewhat concave or convexed.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A coined metal-to-metal porthole fluid sealing connection comprising, a connection body, a fitting device threadably and sealingly connected to said body, said connection body having an outer surface and a porthole extending inwardly from said outer surface, said porthole defined by a porthole wall having female threads thereon, said porthole wall terminating in a transversely extending substantially non-expandible abutment wall, said connection body having a fluid passageway defined by an annular wall meeting with said abutment wall and defining an annular corner therewith, said annular wall at said annular corner having an initial predetermined diameter, said fitting device having a shank portion with a sealing head portion fixedly and sealingly secured thereto and mounted in said porthole, said shank portion having a fluid passageway therein communicating with said fluid passageway in said connection body, said sealing head portion having on a rearward side thereof a shank shoulder and having on a forward side thereof a substantially conical sealing surface engaging said annular corner and flaring from a minimum diameter less than said initial predetermined diameter to a maximum diameter in a direction toward said outer surface, said substantially conical sealing surface being harder than said annular corner, a sleeve nut surrounding said shank portion and having a nut end abuttable against said shank shoulder, said nut end and said shank shoulder making an annular nut shoulder engagement, said sleeve nut having male threads thereon to threadably engage said female threads on said porthole wall for forcing said substantially conical sealing surface against said annular corner to substantially conically deform and thereby coin said annular corner into a self-aligned substantially conical seating surface which self-matches said substantially conical sealing surface, said substantially conical seating surface having a coined minimum diameter less than said initial predetermined diameter of said annular wall at said annular corner, said annular wall at said minimum diameter being deformed and comprising an annular ledge extending inwardly from said initial predetermined diameter.

2. A coined metal-to-metal porthole fluid sealing connection comprising, a connection body, a fitting device threadably and sealingly connected to said body, said connection body having an outer surface and a porthole extending inwardly from said outer surface, said porthole defined by a porthole wall having female threads thereon, said porthole wall terminating in a transversely extending substantially non-expandable abutment wall, said connection body having a fluid passageway defined by an annular wall meeting with said abutment wall and defining an annular corner therewith, said annular wall at said annular corner having an initial predetermined diameter, said fitting device having a shank portion with a sealing head portion fixedly and sealingly secured thereto and mounted in said porthole, said shank portion having a fluid passageway therein communicating with said fluid passageway in said connection body, said sealing head portion having on a rearward side thereof a shank shoulder and having on a forward side thereof a substantially conical sealing surface engaging said annular corner and flaring from a minimum diameter less than said initial predetermined diameter to a maximum diameter in a direction toward said outer surface at an angle which lies between fifteen and seventy-five degrees with respect to the axis of said porthole wall, said substantially conical sealing surface and said transversely extending abutment wall having an angle therebetween lying in a range between fifteen degrees and one-hundred and twenty degrees, said substantially conical sealing surface being harder than said annular corner, a sleeve nut surrounding said shank portion and having a nut end abuttable against said shank shoulder, said nut end and said shank shoulder making an annular nut shoulder engagement, said sleeve nut having male threads thereon to threadably engage said female threads on said porthole wall for forcing said substantially conical sealing surface against said annular corner to substantially conically deform and thereby coin said annular corner into a self-aligned substantially conical seating surface which self-matches said substantially conical sealing surface.

3. A coined metal-to-metal porthole fluid sealing connection comprising, a connection body, a fitting device threadably and sealingly connected to said body, said connection body having an outer surface and a porthole extending inwardly from said outer surface, said porthole defined by a porthole wall having female threads thereon, said porthole wall terminating in a transversely extending substantially non-expandable abutment wall, said connection body having a fluid passageway defined by an annular wall meeting with said abutment wall and defining an annular corner therewith, said annular wall at said annular corner having an initial predetermined diameter, said fitting device having a shank portion with a sealing head portion fixedly and sealingly secured thereto and mounted in said porthole, said shank portion having a fluid passageway therein communicating with said fluid passageway in said connection body, said sealing head portion having on a rearward side thereof a shank shoulder and having on a forward side thereof a substantially conical sealing surface engaging said annular corner and flaring from a minimum diameter less than said initial diameter to a maximum diameter in a direction toward said outer surface at an angle which lies between fifteen and seventy-five degrees with respect to the axis of said porthole wall, said substantially conical sealing surface and said transversely extending abutment wall having an angle therebetween lying in a range between fifteen degrees and one-hundred and twenty degrees, said substantially conical sealing surface being harder than said annular corner, a sleeve nut surrounding said shank portion and having a nut end abuttable against said shank shoulder, said nut end and said shank shoulder making an annular nut shoulder engagement, said sleeve nut having male threads thereon to threadably engage said female threads on said porthole wall for forcing said substantially conical sealing surface against said annular corner to substantially conically deform and thereby coin said annular corner into a self-aligned substantially conical seating surface which self-matches said substantially conical sealing surface, said substantially conical seating surface having a width lying approximately between one-fourth to one-pitch length of said threads, said abutment wall disposed inwardly of said connection body from said outer surface for a distance less than the outside diameter of said female threads, said male threads making not more than five full thread engagement with said female threads.

4. A coined metal-to-metal porthole fluid sealing connection comprising, a connection body, a fitting device threadably and sealingly connected to said body, said connection body having an outer surface and a porthole extending inwardly from said outer surface, said porthole defined by a porthole wall having female threads thereon, said porthole wall terminating in a transversely extending substantially non-expandable abutment wall, said connection body having a fluid passageway defined by an annular wall meeting with said abutment wall and defining an annular corner therewith, said annular wall at said annular corner having an initial predetermined diameter, said fitting device having a shank portion with a sealing head portion fixedly and sealingly secured thereto and mounted in said porthole, said shank portion having a fluid passageway therein communicating with said fluid passageway in said connection body, said sealing head portion having on a rearward side thereof a shank shoulder and having on a forward side thereof a substantially conical sealing surface engaging said annular corner and flaring from a minimum diameter less than said initial predetermined diameter to a maximum diameter in a direction toward said outer surface, said substantially conical sealing surface being harder than said annular corner, a sleeve nut surrounding said shank portion and having a nut end abuttable against said shank shoulder, said nut end and said shank shoulder making an annular nut shoulder engagement, said sleeve nut having male threads thereon to threadably engage said female threads on said porthole wall for forcing said substantially conical sealing surface against said annular corner to substantially conically deform and thereby coin said annular corner into a self-aligned substantially conical seating surface which self-matches said substantially conical sealing surface, said substantially conical seating surface having a coined minimum diameter less than said initial predetermined diameter of said annular wall at said annular corner, said annular wall at said minimum diameter being deformed and comprising an annular ledge extending inwardly from said initial predetermined diameter, said substantially conical seating surface having a width lying approximately between one-fourth to one-pitch length of said threads, said abutment wall disposed inwardly of said connection body from said outer surface for a distance less than the outside diameter of said female threads, said male threads making not more than five full thread engagement with said female threads.

References Cited in the file of this patent

UNITED STATES PATENTS

| 2,171,217 | Kreidel | Aug. 29, 1939 |
| 2,676,781 | Hobbs | Apr. 27, 1954 |
| 2,826,438 | Woodling | Mar. 11, 1958 |

FOREIGN PATENTS

| 398,409 | France | Mar. 23, 1909 |